P. BRAZEAU.
LOCKING RAIL FOR AUTOMOBILES.
APPLICATION FILED JULY 13, 1921.
1,432,589. Patented Oct. 17, 1922.
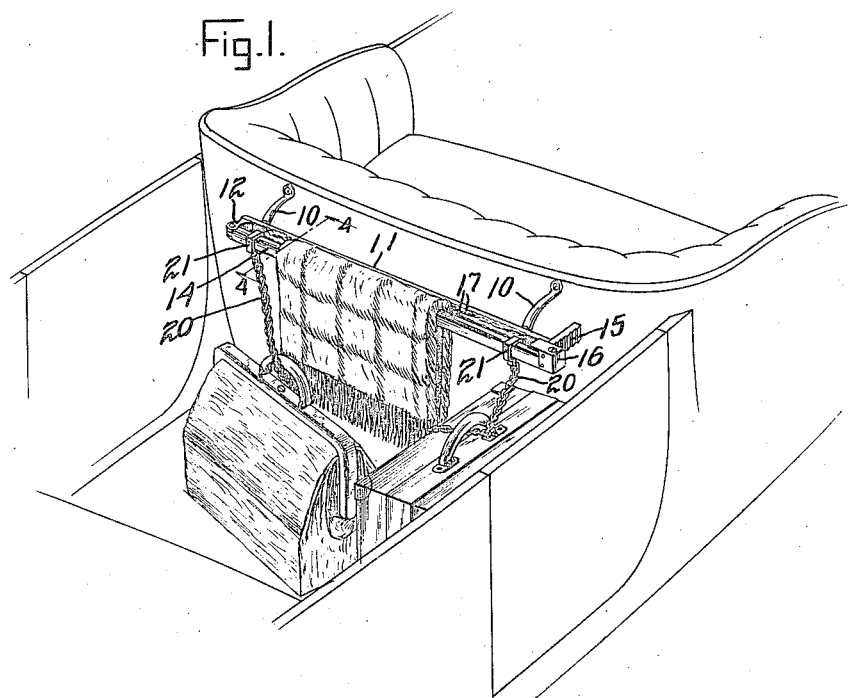
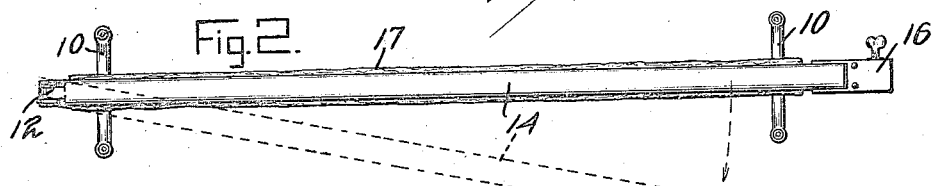
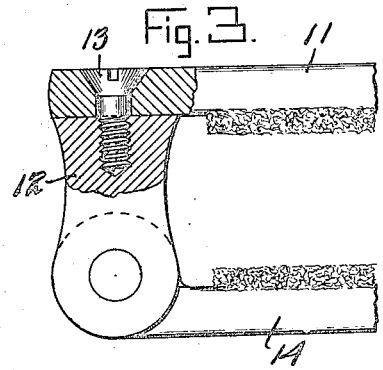
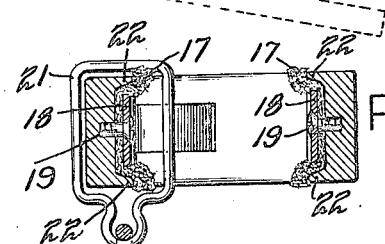
Inventor
Pierre Brazeau
By
Attorney Patented Oct. 17, 1922.

1,432,589

UNITED STATES PATENT OFFICE.

PIERRE BRAZEAU, OF RACINE, WISCONSIN.

LOCKING RAIL FOR AUTOMOBILES.

Application filed July 13, 1921. Serial No. 484,335.

*To all whom it may concern:*

Be it known that I, PIERRE BRAZEAU, a citizen of the United States, residing at Racine, in the county of Racine and State of Wisconsin, have invented certain new and useful Improvements in Locking Rails for Automobiles, of which the following is a specification.

My said invention relates to a robe rail intended primarily for use with automobiles and comprises certain improvements over the device shown in my Patent No. 1,375,553, granted April 19, 1921. It is an object of the invention to provide the longitudinal bars of the patent with improved clamping means for holding robes and the like when locked together.

Another object of my invention is to provide means in connection with the robe rail for securing hand baggage against unauthorized removal.

Still another object is to provide an improved pivot for the removable element of the rail whereby it can be manipulated with greater facility and less inconvenience to occupants of the tonneau.

Referring to the accompanying drawings which are made a part hereof and on which similar reference characters indicate similar parts, Figure 1 is a perspective of a portion of an automobile showing my device in operative position thereon.

Figure 2 is a rear elevation of the device.

Figure 3 a detail of the pivot and adjacent parts, and

Figure 4 a section on line 4—4 of Figure 1.

In the drawings reference character 10 indicates brackets adapted to be attached to the rear of an automobile seat or to some other supporting device adapted to carry means for holding robes and the like. A bar 11 is fixed to the brackets 10 and has at one end thereof a post 12 attached to the bar by a screw 13, the screw being loose in the bar so that the screw and the member 12 can turn freely about a horizontal axis. A second bar 14 is pivoted to the free end of post 12 and has at its free end a toothed locking member 15 as in my prior patent, said member cooperating with a lock 16. At the inner side of each bar is a longitudinal groove providing a concave formation and a strip 17 of felt or like material is fixed to each bar as by a strip of metal 18 held in place by screws 19 at the bottom of the respective grooves. The strip 17 projects at both sides of the metallic strip and preferably extends out over the edges of the rail.

I have also provided a chain 20 of any convenient length which is here shown as being attached to the movable bar by links 21 extending thereabout, the links being of convenient size to be slipped over the bar and its attached portion 15.

In operation the movable bar is swung back from the seat to disengage part 15 from lock 16 and may then be swung down into the dotted position of Figure 2 or may be swung up if desired. In either case it is out of the way of the occupants of the rear seat and especially in the upper position it does not interfere with their movements into and out of the car or with the moving of handbags and parcels. The free end of the chain with its attached link 21 may then be slipped through the handle of a suit case or handbag and placed on the bar as shown in Figure 1. One or more lap robes or overcoats or the like may also be hung over the movable bar which is then returned to position and part 15 engaged with the lock the rail being moved inward sufficiently to clamp the robes firmly between the two bars. It will be evident that the edges 22 of the bars will bite into and firmly hold robes held by the bars, and that any attempt to remove the robes will cause the edges of strips 17 to curl over at one side and so offer increased resistance to such removal.

It will be evident to those skilled in the art that my device may be modified in various ways within the scope of my invention as defined in the appended claim and therefore I do not limit myself to the specific devices shown in the drawings and described in the specification, but only as indicated in the claim.

Having thus fully described my said invention, what I claim as new and desire to secure by Letters Patent, is:

In a robe rail for attachment to the rear of a vehicle seat, a fixed bar and a movable bar, each bar having a longitudinal groove providing gripping edges opposed to those on the other bar, a strip of fabric secured to the face of each bar and projecting over said gripping edges, a post between the said bars at one end, means for pivoting the post to the fixed bar, means for pivoting the movable bar to the post, said pivots being at right angles to afford universal movement, and means for locking together the other ends of the bars, substantially as set forth.

In witness whereof, I have hereunto set my hand and seal at Racine, Wisconsin, this ninth day of July, A. D. nineteen hundred and twenty-one.

PIERRE BRAZEAU. [L. S.]

Witnesses:
JEROME J. FOLEY,
VIOLA HANSEN.